United States Patent

Linderholm

[11] Patent Number: 6,129,489
[45] Date of Patent: Oct. 10, 2000

[54] EQUIPMENT FOR CUTTING A HOLE OR CAVITY FORMATION IN A CURVED OR FLAT WALL ELEMENT AND FOR CUTTING OUT A DISC-SHAPED PIECE OF MATERIAL FITTING THE HOLE OR CAVITY FORMATION

[75] Inventor: Dag Linderholm, Ronninge, Sweden

[73] Assignee: Novator AB, Stockholm, Sweden

[21] Appl. No.: 09/125,311

[22] PCT Filed: Feb. 4, 1997

[86] PCT No.: PCT/SE97/00164

§ 371 Date: Aug. 13, 1998

§ 102(e) Date: Aug. 13, 1998

[87] PCT Pub. No.: WO97/29953

PCT Pub. Date: Aug. 21, 1997

[30] Foreign Application Priority Data

Feb. 16, 1996 [SE] Sweden .................................. 9600573

[51] Int. Cl.[7] .................................................. B23C 1/20
[52] U.S. Cl. ............................ 409/178; 408/76; 408/77; 409/179; 409/182
[58] Field of Search ................................ 408/76, 77, 88; 409/175, 178, 179, 181, 182; 144/24.16, 135.2, 136.1, 144.1, 144.51, 144.52, 154.52

[56] References Cited

U.S. PATENT DOCUMENTS

| 2,546,957 | 3/1951 | Ray ........................................... 408/88 |
| 4,281,694 | 8/1981 | Gorman .................................... 409/182 |
| 4,383,870 | 5/1983 | Creech ..................................... 148/9 R |
| 4,735,531 | 4/1988 | Boerckel et al. ........................ 409/182 |
| 4,755,232 | 7/1988 | Thönes et al. ........................... 148/9 R |
| 5,468,099 | 11/1995 | Wheetley et al. ........................ 408/76 |

FOREIGN PATENT DOCUMENTS

| 4433926 A1 | 2/1995 | Germany . |
| 427993 | 7/1968 | Sweden . |
| 351148 | 5/1983 | Sweden . |

*Primary Examiner*—Daniel W. Howell
*Attorney, Agent, or Firm*—Taylor & Aust, P.C.

[57] ABSTRACT

Equipment for making a hole or cavity formation in a curved or planar wall element, and for cutting out a disc-shaped piece of material fitting the hole or cavity formation, includes a frame with devices for fixing it on the wall element, and a carriage displaceably mounted in a first linear direction. A slide is mounted to be displaceable in a direction perpendicular to the first linear direction and carries a tool unit. The carriage has wheel sets which are biased against the wall element. The wheel sets are pivotable and displaceably mounted on a respective guide slide, which is mounted to be displaceable in the first linear direction.

26 Claims, 3 Drawing Sheets

EQUIPMENT FOR CUTTING A HOLE OR CAVITY FORMATION IN A CURVED OR FLAT WALL ELEMENT AND FOR CUTTING OUT A DISC-SHAPED PIECE OF MATERIAL FITTING THE HOLE OR CAVITY FORMATION

BACKGROUND OF THE INVENTION

1. Field of the Invention

The present invention relates in general to equipment for cutting a hole or cavity in a curved or flat wall element.

2. Description of the Related Art

It has previously been quite difficult, if at all possible, to make very precise and reliable repairs of damage to shell structures having a curved surface, especially in the field. This is the case when, for example, damage has occurred to a wing or a fuselage of an airplane. Due to the fact that the outer wall of the structural components of the airplane are often curved along a single axis and can be formed of composite material, special requirements are placed on the precision and geometry, not only in making a new larger hole or cavity about the damage, but also when making new disc-shaped pieces of material which must fit precisely into the cut out hole or cavity.

SUMMARY OF THE INVENTION

The present invention suggests equipment which makes possible cutting of a well-defined hole or cavity in a curved wall element, where the hole is of arbitrary configuration and a suitable joint arrangement, for example, a step joint with the desired geometry. The equipment according to the invention also makes possible creating a plurality of screw or rivet holes in a desired closely spaced hole distribution around wall damage. A corresponding hole distribution is created around a disc-shaped repair patch intended to overlap the damage, without the aid of special templates or drill bushings.

The invention includes a frame with devices mounted thereon for fixing the frame to the wall element; first rectilinear, parallel guide devices fixed in the frame for guiding a respective support device of a carriage displaceably mounted in the frame in a first linear direction, the support devices having slide or roller elements intended to be in contact with the surface of the wall element and facilitating the movement of the carriage thereon in the first linear direction; second rectilinear, parallel guide devices connecting respective support devices to each other; a slide which is displaceably mounted on the second guide devices in a second linear direction substantially perpendicular to the first linear direction, the slide being disposed to carry a tool unit for cutting a hole or cavity in the wall element; a guide slide which is displaceably mounted on cooperating first guide devices and which is joined to a respective support device in such a manner that the support device is, firstly, pivotally mounted relative to the guide slide about a pivot axis parallel to the second guide devices, and, secondly, is displaceably mounted relative to the guide slide in a direction normal to the surface of the wall element against which the slide or roller elements of the support devices are intended to be in contact; and devices arranged to bias each support device with its slide or roller element against the surface of the wall element. Such an arrangement makes it possible to anchor the frame in such a manner over the damage to the wall element that the carriage and the tool unit carried thereon can be made to follow the curvature of the wall element with the operating axis of the tool unit always oriented perpendicular to the surface of the curved wall element.

In order to facilitate guiding and limiting the movement of the tool unit over the wall element, the frame is suitably arranged to support a template having a cam surface with a profile corresponding to the perimeter of the hole or cavity which is to be cut into the wall element. The slide, or the tool unit carried thereon, has a component in the form of a cam follower designed to move in contact with the cam surface.

The equipment is preferably so dimensioned and designed so as to be portable and suitable for use in the field. The carriage and the slide with the tool unit mounted thereon can thus be manually operated for cutting the hole or cavity, with the cam follower in contact with the cam surface of the template. By virtue of the fact that the frame can be fixed to a wall element in any plane orientation, the operator does not need to carry any portion of the weight of the equipment when it is being used. The equipment permits working close to edges and impediments, e.g., mountings on an airplane wing.

The above-described equipment, possibly with certain components modified or excluded, can also be used for cutting disc-shaped pieces of material (repair patches), the peripheral shape of which exactly corresponds to that of the hole or cavity in the wall element. The equipment can also be used for cutting repair patches which are to overlap a damaged section and which are to be fixed in place with screws or rivets onto the damaged wall element. The frame itself needs to have its fixing devices mounted on a surface having substantially the same curvature profile as the wall element where the hole or cavity has been cut out. It is only necessary in this case that the carriage with its support devices be arranged to run on such a corresponding profile surface, which can also suitably form the subsurface for the sheet of material from which the disc is to be cut. The frame can be placed in an underframe which is, in turn, supported on a solid subsurface. The tool unit used in this case includes a cutting unit, such as a cutting wheel, a laser knife, a water jet nozzle or the like.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
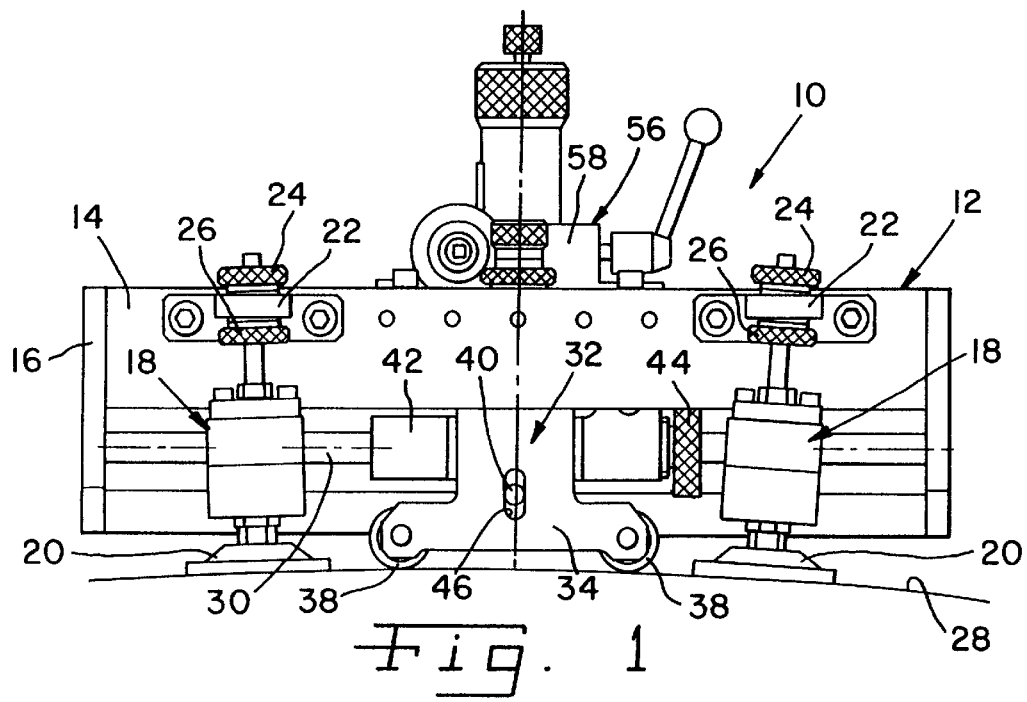
FIG. 1 is a side view of equipment according to one embodiment of the present invention, fixed on a curved surface.
Figure 2:
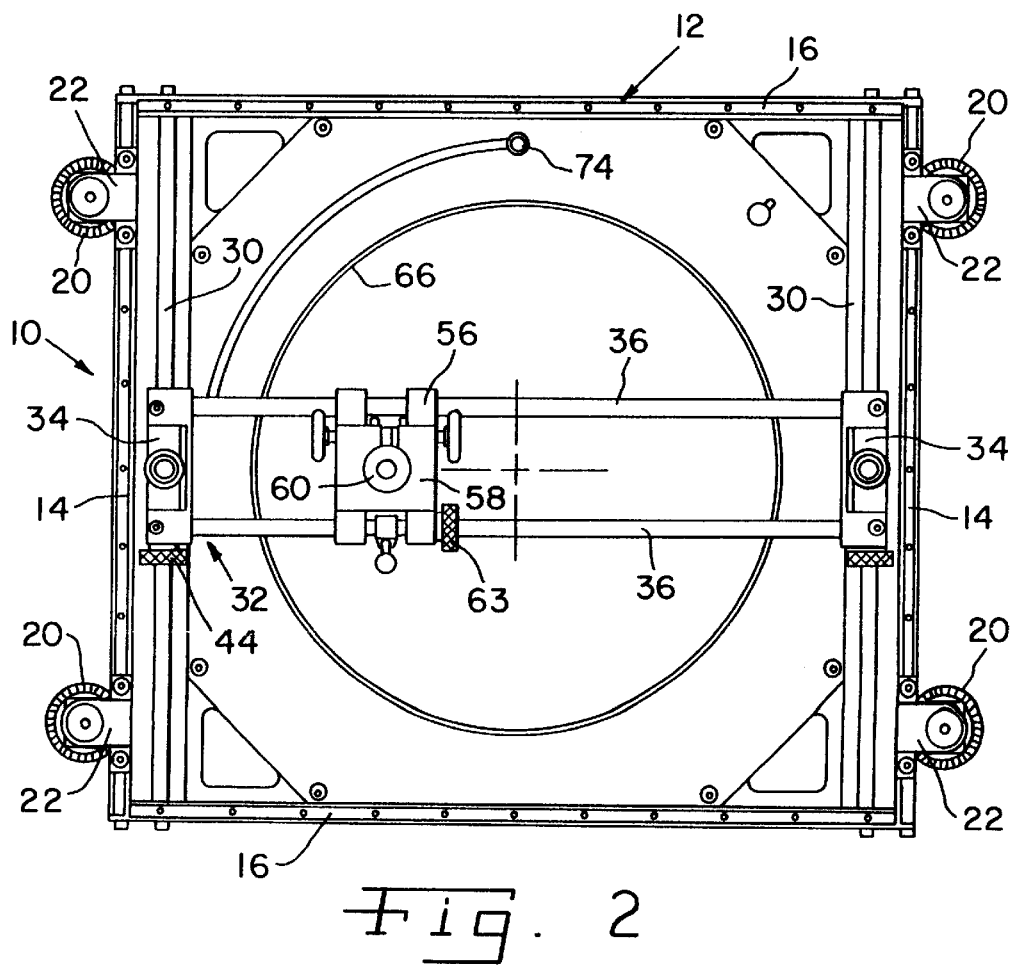
FIG. 2 is a plan view of the equipment in FIG. 1.

Referring now to the drawings and particularly to FIGS. 1 and 2, there is shown equipment 10 for simple and precise cutting of a hole or cavity formation in an underlying single-curved or flat piece of material. The equipment is primarily, but not exclusively, intended to be used in the field for repairing damage to wall elements of shell structures, e.g., single-curved wall elements, such as surface sections of wings or parts of airplanes. Such wall elements in modern airplanes are often single-curved and can be formed of composite material. This places special tolerance requirements on both the cutting of new holes or cavities around an existing damaged area and the cutting of one or more new pieces of material, which must fit exactly and be fixed in the hole or cavity. The equipment 10 makes possible such a simplified exact cutting of holes and cutting of new pieces of material to fit therein.

The equipment 10 includes a frame 12 which has the shape of a rectangular frame 12 with opposite pairs of lateral frame beams 14 and 16. In each of the lateral frame beams 14 and 16 there are adjustably mounted a pair of frame-fixing devices 18 having suction cups 20. Each device 18 is supported in a respective holder 22, which is releasably fixable and movable laterally. The device 18 can be fixed in holder 22 by use of locking devices 24, 26 so that the longitudinal axis of the device 18 is kept oriented substantially normal to the curved (or planar) surface 28 on which the frame 12 is to be fixed. Frame 12 is positioned over an existing damaged area or where a hole or cavity is to be cut for some other reason.

At the end portions of the lateral frame beams 16 there are fixed a pair of first parallel guide devices in the form of guides 30 for linear guiding of a carriage 32. The carriage 32 includes wheel sets 34 cooperating with individual guides 30. The wheel sets 34 are joined to each other by use of a pair of second parallel guides 36 oriented perpendicular to the first guides 30.

Figure 3:
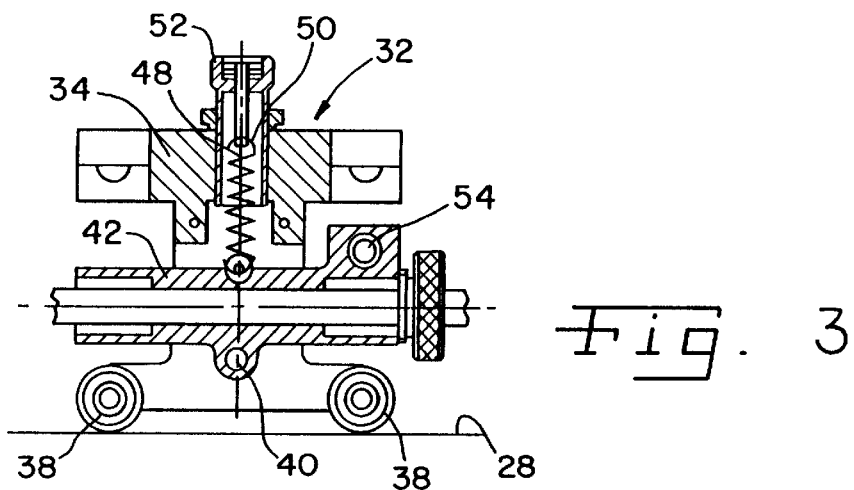
FIG. 3 is a sectional, side view of a wheel set for a carriage of the equipment of FIG. 1, linearly movable in the frame and biased against the subsurface.
Figure 4:
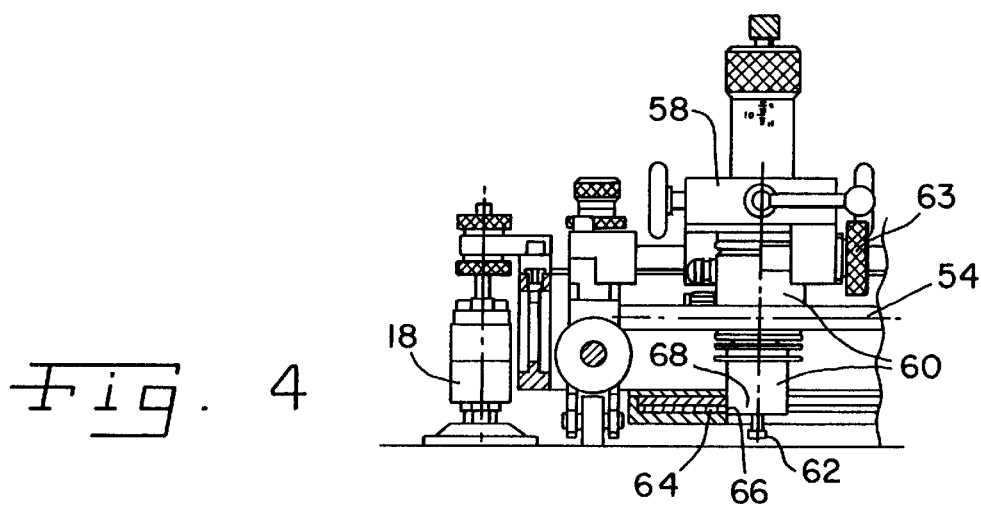
FIG. 4 is a fragmentary, front view of the equipment of FIG. 1, where a tool unit cooperates with a cam surface of a hole-cutting template.

Each wheel set 34 has a pair of rollers or wheels 38 spaced in the direction of movement of the carriage 32, in contact with the surface 28 of the wall element in which a hole or cavity is to be cut. As can be seen in FIG. 3, the wheel set 34 is pivotally mounted via a pin 40 in a guide slide 42. Guide slide 42 is displaceably guided on the guide 30 and can be locked thereto by use of a lock knob 44. The wheel set 34 is also limitedly displaceably mounted, relative to the guide slide 42, with the direction of displacement being perpendicular to the surface 28 on which the wheels 38 roll. Enabling this displacement is a slot 46 (FIG. 1) in the wheel set 34. Slot 46 displaceably guides the pin 40 fixed in the slide 42. In order to keep the wheels 38 of the wheel sets 34 in contact with the surface 28 regardless of whether the frame 12 is fixed above a surface, as shown in FIG. 1, or is fixed suspended on the underside of a surface to be cut, the wheel set 34 is kept pressed against the surface 28 by use of a tensile spring 48. Tensile spring 48 is fixed at 50 centrally between the pin 40 in the guide slide 42 and an adjustable anchoring element 52 in the upper portion of the wheel set 34. The guide slides 42 on the guides 30 are joined to each other by a transverse rod 54 (FIGS. 3 and 4).

A slide 56 is displaceably mounted on the transverse second guides 35. A holder 58 is arranged on a slide 56 to vertically fix a schematically-indicated tool unit 60 supporting a tool 62. Tool 62 can be, e.g., a chip-cutting tool, a high-pressure nozzle, a laser implement or the like, for the desired cutting of the wall element on which the frame 12 is mounted. The slide 56, like the wheel sets 34, can be locked to its guides 36 by use of a lock knob 63 (FIGS. 2 and 4). The tool unit 60 can, for example, include a high-speed pneumatic turbine motor when using chip-cutting tools.

Figure 5:
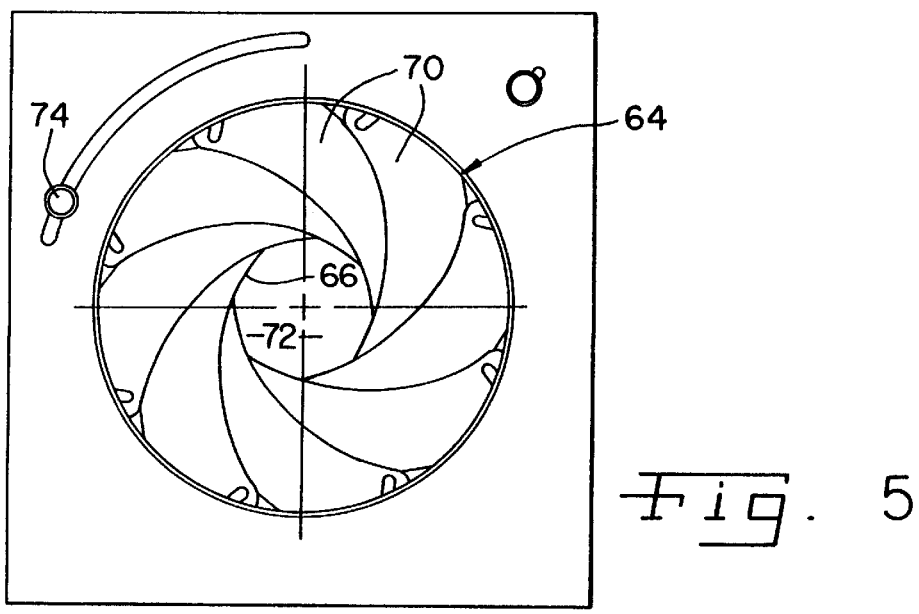
FIG. 5 is a plan view of a hole-cutting template of the equipment of FIG. 1, in the form of a leaf diaphragm.

The frame 12 also supports a template or stencil 64 which forms a cam surface 66 for guiding a cam follower 68 on the tool unit 60. When circular holes or cavities are to be cut in the wall element, it is suitable to use a template in the form of pivoting diaphragm leaves 70 (FIG. 5) arranged in the form of a ring. The diameter of the central hole 72 of the diaphragm can be varied by pivoting the leaves 70 with the aid of an operating pin 74 via a pivot mechanism (not shown).

Figure 6:
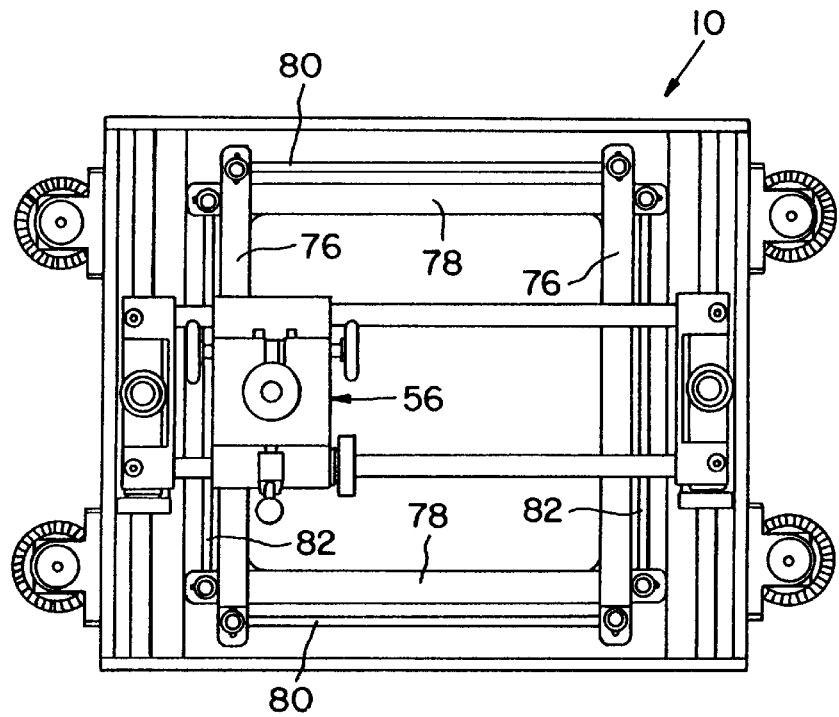
FIG. 6 is a plan view of another embodiment of the equipment according to the invention, in which intersecting ruler elements are used to form a hole-cutting template.

If the holes or cavities are to have another peripheral shape, e.g., a square or triangle, a system of intersecting rulers 76, 78 and be used instead of the diaphragm leaves 70. Rulers 76 and 78 are displaceable and pivotable on a pair of guide rods 80 and 82, respectively, as shown in FIG. 6.

Figure 7:
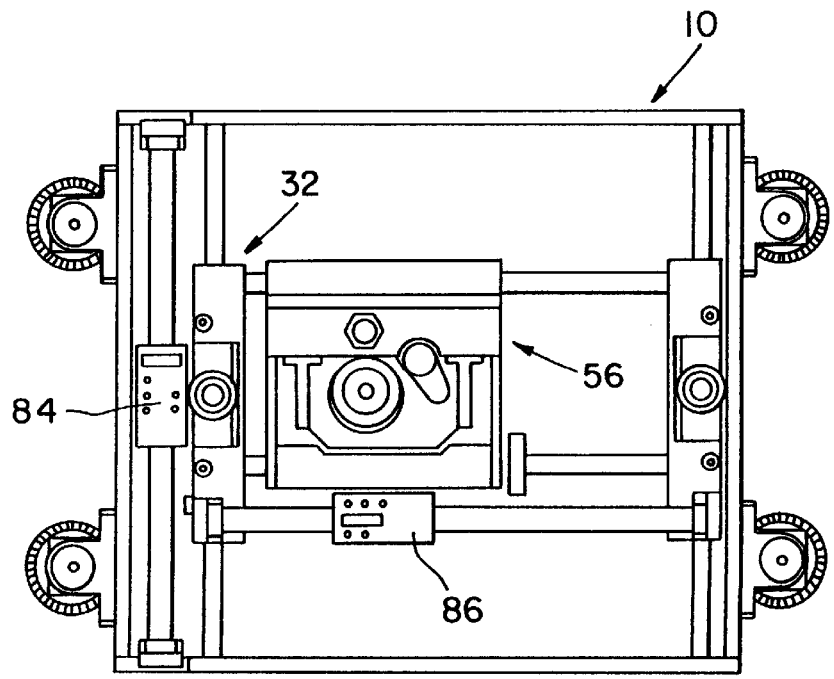
FIG. 7 is a plan view of yet another embodiment of the equipment according to the invention, where a respective positional indicator is coordinated with each of the carriage and a slide displaceable transverse thereto.

As can be seen in FIG. 7, positional indicators 84 and 86 can be coupled to the carriage 32 and the slide 56, respectively, to provide the positional coordinates for the tool 62. Positional indicators 84 and 86 are especially useful in those cases where screw or rivet holes are to be made in a wall element and corresponding holes are to be made in a disc-shaped piece of material which is to provisionally cover a damaged area on the wall element. Since it is difficult to achieve screw holes or rivet holes with sharp edges in the composite material often used in modern aircraft, a cutting technique is required wherein the cutting tool rotating about its central axis is at the same time subjected to an oscillating or circular movement about another axis. Such a cutting technique can provide low cutting forces, good quality of the hole and ease of chip removal.

A dust and chip vacuum device, the outside of which is suitably formed by the above-mentioned cam follower 68, can be coordinated with the tool unit 60. This assures good chip removal when cutting holes and cavities.

The above described equipment can also be used to cut out pieces of material the peripheries of which precisely correspond to the holes or cavities cut into the wall element. For this purpose, it is required that the material from which the pieces are to be cut be placed on a substrate which is preferably made with a profile surface corresponding to that of the cut hole or cavity. The material can be a sheet or web of material fixed to the supporting surface. The wheel set 34 of the carriage 32 must then be able to run on the profiled supporting surface. The fixing devices 18 do not necessarily need to be anchored on the profiled supporting surface. Rather, they can rest on an adjacent flat supporting surface. Alternatively, fixing devices 18 may not be used at all if the frame 12 is coupled to another frame set up on the supporting surface at the cutting location. The tool unit has in this case a cutting tool, e.g., a cutting wheel, a water jet nozzle or a laser knife.

The equipment 10 according to the invention is designed to be used in the following manner for cutting holes or cavities. For repairing in the field a damaged portion of a single-curved wall portion of an airplane wing, for example, the frame 12 is centered over the damaged portion and is fixed in place by use of the fixing device 18 and the suction cups 20. The cam follower 68 of the tool unit 60 is brought into contact with the cam surface 66 of the template 64, and the tool 62 of the tool unit 60 is then brought to the desired cutting depth. The slide 56 can then be manually moved along the cam surface 66 of the template 64 in order to cut a circular hole, for example. Preferably, the hole is cut in such a manner that a step-shaped hole edge surface is formed, which provides a stronger joint. Alternatively, a provisional repair with an overlapping patch can be used with a plurality of small holes for rivets or screws.

The equipment 10 can then, as described above, be used to correspondingly cut one or more disc-shaped complementary pieces of material which precisely fit the hole or cavity in the wall of the wing. For composite material, a plurality of thin pieces of material are suitably cut out. The thin pieces of material are then glued together or otherwise assembled to form an integrated piece of material for placement and fixing into the cut hole. For provisional repair with an overlapping repair patch, rivet or screw holes are cut therein corresponding to the holes in the wall element, with the aid of the positional indicators 84, 86.

Within the scope of the invention, it is also possible to use the equipment for repairing all types of curved glass or plastic sheets or panes. For example, it is possible to repair airplane windshields and cockpits.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. Apparatus for cutting one of a hole and a cavity in a wall element having a surface, the wall element being one of curved and planar, said apparatus comprising:

a frame;

at least one fixing device mounted on said frame, said at least one fixing device being configured for fixing said frame to the wall element;

at least one carriage displaceably mounted in said frame;

a plurality of support devices connected to said at least one carriage, said support devices including one of a plurality of slide elements and a plurality of roller elements, said one of a plurality of slide elements and a plurality of roller elements being configured for contacting the surface of the wall element and for facilitating movement of said at least one carriage in a first linear direction;

a plurality of rectilinear, parallel first guide devices fixed in said frame, each said first guide device being configured for guiding a respective said support device in said first linear direction;

a plurality of rectilinear, parallel second guide devices interconnecting said support devices;

a slide displaceably mounted on said second guide devices, said slide being displaceable in a second linear direction substantially perpendicular to said first linear direction;

a tool unit carried by said slide, said tool unit being configured for cutting the one of a hole and a cavity in the wall element;

a guide slide displaceably mounted on a selected cooperating said first guide device, said guide slide having a pivot axis substantially parallel to said second guide devices, said guide slide being pivotally connected to a respective said support device about said pivot axis, said selected support device being displaceably mounted to said guide slide such that said selected support device is displaceable in a direction substantially perpendicular to the surface of the wall element; and a plurality of biasing devices, each said biasing device being configured for biasing said one of a plurality of slide elements and a plurality of roller elements of a respective said support device against the surface of the wall element.

2. The apparatus of claim 1, wherein the one of a hole and a cavity has a peripheral configuration, said frame carrying a template having a cam surface with a profile configured to correspond to the peripheral configuration of the one of a hole and a cavity, one of said slide and said tool unit including a cam follower configured for contacting said cam surface.

3. The apparatus of claim 2, wherein said cam surface of said template comprises a ring of pivotable diaphragm leaves.

4. The apparatus of claim 2, wherein said cam surface of said template comprises a plurality of adjustable intersecting ruler elements.

5. The apparatus of claim 1, wherein said one of a plurality of slide elements and a plurality of roller elements of said support devices comprises a plurality of roller elements spaced apart in said first linear direction.

6. The apparatus of claim 1, wherein said respective support device includes a slot, said guide slide including a pin disposed in said slot, said pin defining said pivot axis, said slot and said pin conjunctively defining a means for allowing pivotal movement and limited displacement of said respective support device relative to said guide slide.

7. The apparatus of claim 1, wherein each said biasing device comprises a spring element configured for biasing said selected support device away from said guide slide.

8. The apparatus of claim 7, wherein said spring element comprises a tensile spring fixed centrally between said guide slide and said selected support device.

9. The apparatus of claim 8, wherein said tensile spring has a tension level, said tensile spring including an anchoring point, said selected support device including an adjustable anchoring element configured for moving said anchoring point to thereby change said tension level of said tensile spring.

10. The apparatus of claim 1, wherein said at least one fixing device includes at least one suction cup.

11. The apparatus of claim 1, wherein said at least one fixing device is pivotally attached to said frame.

12. The apparatus of claim 1, further comprising a first positional indicator coordinated with said at least one carriage and a second positional indicator coordinated with said slide, each of said first positional indicator and said second positional indicator being configured for indicating positional coordinates of said tool unit.

13. The apparatus of claim 1, further comprising a first locking device and a second locking device, said first locking device being configured for locking at least one said carriage to at least one said first guide device, said second locking device being configured for locking said slide to at least one said second guide device.

14. The apparatus of claim 1, wherein said tool unit includes a chip-cutting tool.

15. The apparatus of claim 14, wherein said chip-cutting tool has a center axis substantially parallel to a second axis, said tool unit being configured to simultaneously:

rotate said chip-cutting tool about said center axis of said chip-cutting tool; and rotate said center axis of said chip-cutting tool in a substantially circular path about said second axis.

16. Apparatus for cutting out a disc-shaped piece of material from one of a web of material and a sheet of material, said apparatus comprising:

a frame configured to be fixed to a solid supporting surface;

at least one carriage displaceably mounted in said frame;

a plurality of support devices connected to said at least one carriage, said support devices including one of a plurality of slide elements and a plurality of roller elements, said one of a plurality of slide elements and a plurality of roller elements being configured for contacting a profile surface and for facilitating movement of said at least one carriage in a first linear direction;

a plurality of rectilinear, parallel first guide devices fixed in said frame, each said first guide device being configured for guiding a respective said support device in said first linear direction;

a plurality of rectilinear, parallel second guide devices interconnecting said support devices;

a slide displaceably mounted on said second guide devices, said slide being displaceable in a second linear direction substantially perpendicular to said first linear direction;

a tool unit carried by said slide, said tool unit being configured for cutting out the disc-shaped piece of material from the one of a web of material and a sheet of material;

a guide slide displaceably mounted on a selected cooperating said first guide device, said guide slide having a pivot axis substantially parallel to said second guide devices, said guide slide being pivotally connected to a respective said support device about said pivot axis, said selected support device being displaceably mounted to said guide slide such that said selected support device is displaceable in a direction substantially perpendicular to the profile surface; and a plurality of biasing devices, each said biasing device being configured for biasing said one of a plurality of slide elements and a plurality of roller elements of a respective said support device against the profile surface.

17. The apparatus of claim 16, wherein the piece of material has a peripheral configuration, said frame carrying a template having a cam surface with a profile configured to correspond to the peripheral configuration of the piece of material, one of said slide and said tool unit including a cam follower configured for contacting said cam surface.

18. The apparatus of claim 17, wherein said cam surface of said template comprises a ring of pivotable diaphragm leaves.

19. The apparatus of claim 17, wherein said cam surface of said template comprises a plurality of adjustable intersecting ruler elements.

20. The apparatus of claim 16, wherein said one of a plurality of slide elements and a plurality of roller elements of said support devices comprises a plurality of roller elements spaced apart in said first linear direction.

21. The apparatus of claim 16, wherein said respective support device includes a slot, said guide slide including a pin disposed in said slot, said pin defining said pivot axis, said slot and said pin conjunctively defining a means for allowing pivotal movement and limited displacement of said respective support device relative to said guide slide.

22. The apparatus of claim 16, wherein each said biasing device comprises a spring element configured for biasing said selected support device away from said guide slide.

23. The apparatus of claim 22, wherein said spring element comprises a tensile spring fixed centrally between said guide slide and said selected support device.

24. The apparatus of claim 11, wherein said tensile spring has a tension level, said tensile spring including an anchoring point, said selected support device including an adjustable anchoring element configured for moving said anchoring point to thereby change said tension level of said tensile spring.

25. The apparatus of claim 16, wherein said tool unit includes a chip-cutting tool, said chip-cutting tool comprising one of a cutting wheel, a laser knife and a water jet nozzle.

26. The apparatus of claim 16, wherein the supporting surface comprises the profile surface.

* * * * *

UNITED STATES PATENT AND TRADEMARK OFFICE
CERTIFICATE OF CORRECTION

PATENT NO. : 6,129,489
DATED : October 10, 2000
INVENTOR(S) : Dag Linderholm

It is certified that error appears in the above-identified patent and that said Letters Patent is hereby corrected as shown below:

Column 8
Line 32, delete "11" and substitute --23-- therefor.

Signed and Sealed this

Eighth Day of May, 2001

*Attest:*

NICHOLAS P. GODICI

*Attesting Officer*      Acting Director of the United States Patent and Trademark Office